(12) United States Patent
Mwaura

(10) Patent No.: US 6,779,002 B1
(45) Date of Patent: Aug. 17, 2004

(54) COMPUTER SOFTWARE FRAMEWORK AND METHOD FOR SYNCHRONIZING DATA ACROSS MULTIPLE DATABASES

(75) Inventor: James G. Mwaura, Irving, TX (US)

(73) Assignee: Sprint Communications Company L.P., Overland Park, KS (US)

(*) Notice: Subject to any disclaimer, the term of this patent is extended or adjusted under 35 U.S.C. 154(b) by 163 days.

(21) Appl. No.: 09/592,795

(22) Filed: Jun. 13, 2000

(51) Int. Cl.$^7$ .............................................. G06F 17/30
(52) U.S. Cl. ................... 707/203; 707/101; 707/104.1; 709/201; 709/202; 709/223
(58) Field of Search ........................... 707/1, 101, 200, 707/203, 104.1; 709/203, 202, 201, 223

(56) References Cited

U.S. PATENT DOCUMENTS

| | | | | |
|---|---|---|---|---|
| 5,542,078 A | * | 7/1996 | Martel et al. ............... | 707/101 |
| 5,944,783 A | * | 8/1999 | Nieten ......................... | 709/202 |
| 6,088,717 A | * | 7/2000 | Reed et al. .................. | 709/201 |
| 2003/0055929 A1 | * | 3/2003 | Ding et al. .................. | 709/223 |

OTHER PUBLICATIONS

"Integration of Relational Database in a Multi database System based on Schema Enrichment" by Daniel Keim, Hans Kriegel and Andreas Meithsam published 2/93, IEEE, pp. 96–104.*

* cited by examiner

Primary Examiner—Charles Rones

(57) ABSTRACT

The present invention discloses a computer software framework and method for synchronizing data across multiple databases. The present invention discloses a method for synchronizing data, which comprises instantiating a first data synchronization service object and a second data synchronization object. The first data synchronization service object is connected to a first datastore, and the second data synchronization service object is connected to a second datastore. A data synchronization message containing relevant information is sent from the first data synchronization service object to an outbox queue on the first datastore. The data synchronization message is propagated from the outbox queue on the first datastore to an inbox queue on the second datastore. The data synchronization message is received from the inbox queue on the second datastore to the second data synchronization object, and the relevant information is persisted in the second datastore. The present invention further discloses a data synchronization framework, which comprises a data synchronization service object connected to an underlying datastore. The data synchronization service object contains a method to send an outgoing synchronization message to the datastore and further contains a method to retrieve an incoming synchronization message from the datastore. The data synchronization framework further comprises a persistence component for persisting relevant information contained in the retrieved incoming data synchronization message to the underlying datastore in response to a persistence request from the synchronization service object. In a preferred embodiment, the datastore is a relational database having an inbox queue and an outbox queue.

13 Claims, 3 Drawing Sheets

COMPUTER SOFTWARE FRAMEWORK AND METHOD FOR SYNCHRONIZING DATA ACROSS MULTIPLE DATABASES

BACKGROUND OF THE INVENTION

The present invention is a lightweight, service-oriented computer software framework and method that provides a means to synchronize common data between applications with unique schemas on different databases. The invention provides a lightweight publish/subscribe (pub/sub) messaging framework for use by an enterprise that desires its distributed applications and other disparate systems to synchronize their common data without requiring them to share databases or have similar database schemas.

A company may have a single customer who purchases a number of different products or services such as long distance service, wireless phone service, cable television service, etc. Each business unit within the company providing these individual services may have a separate computing system hosting a variety of business applications, which in turn may interact with any number of lower level datastores to create, retrieve, update, and delete data processed by the application. Much of the data residing in the various datastores will be common to each customer. In other words, the long distance service datastores may contain data for the customer such as name, address, billing information, etc. that is the same as (i.e., common to) data contained in the wireless phone service datastores and the cable television datastores. A need exists for an efficient way to synchronize the common customer data across the various computing systems of the entire enterprise.

One solution is to limit the data to a single set (which may reside on any number of datastores) and have all business applications enterprise wide access data from the single set. In other words, there is only one set of data for a given customer, and therefor the data must only be updated once. Since there is only one set of data, there is no need to synchronize different data sets. For example, a customer's address could be placed in a single database. Should the customer's address change, the database need only be updated once with the customer's new address, and subsequent access by any application would produce the correct, updated customer address. The problem with a common data set is that most enterprise wide computing systems are a conglomeration of separate and distinct computing systems, each of which has its own datastores and schemas (i.e., methods and formats) for storing data. Therefore, an attempt to converge a large computing system to a common set of data would be extremely burdensome.

Messaging products such as Oracle Inc.'s Advanced Queuing (AQ) messaging technology, which is included with Oracle products such as Oracle8 database release 8.0.5 with Advanced Queuing and Objects Options, have attempted to address data synchronization on the database level. In brief, AQ provides a means for relational databases operating on a common computer system to exchange data. For example, applications with unique schemas on independent Oracle databases could synchronize their common data by registering message 'triggers' on their tables of interest and defining the conditions necessary to fire these triggers whenever data was updated. Thus, whenever relevant data was updated, these 'triggers' would create rigid messages or data structures capturing the content of the updated information, call methods/packages on structured query language (SQL) interfaces to Oracle Advanced Queues, and send the messages/data structures previously created. For applications with similar schemas on independent Oracle databases, synchronization of common data could simply be achieved through database replication.

The problem with attempting to synchronize data at the database level is that the databases must reside on the same computer system, for example a local area network/server, in order for the databases to exchange information. Database level messaging is not suitable for synchronizing data on an enterprise wide scale where data resides in a plurality of databases across a variety of computing systems. The current invention addresses the need for an enterprise-level framework and method to synchronize common data residing on plurality of different databases. The invention provides distributed access to a data synchronization means, thereby allowing individual systems and applications to structure their data storage schemas to fit their own purposes such as to achieve efficiency in development or performance.

The current invention makes the task of updating and synchronizing data much simpler from an application perspective. The application, through use of the invention, need only send data synchronization messages to a single outbox queue (which in turn will propagate the messages broadly) and need only receive data synchronization messages from a single inbox queue, thereby avoiding burdensome publication and subscribe tasks such as executing wide-distribution of messages, updating and maintaining detailed subscriber lists, etc. Thus, the application runs more efficiently by isolating itself through use of the current invention.

SUMMARY OF THE INVENTION

The present invention discloses a method for synchronizing data, comprising instantiating a first data synchronization service object and a second data synchronization object, the first data synchronization service object being connected to a first datastore and the second data synchronization service object being connected to a second datastore; sending a data synchronization message containing relevant information from the first data synchronization service object to an outbox queue on the first datastore; propagating the data synchronization message from the outbox queue on the first datastore to an inbox queue on the second datastore; receiving the data synchronization message from the inbox queue on the second datastore to the second data synchronization object; and persisting the relevant information in the second datastore.

The present invention further discloses a data synchronization framework, comprising a data synchronization service object connected to an underlying datastore, the data synchronization service object having a method to send an outgoing synchronization message to the datastore and a method to retrieve an incoming synchronization message from the datastore; and a persistence component for persisting relevant information contained in a retrieved data synchronization message to the underlying datastore in response to a persistence request from the synchronization service object. In a preferred embodiment, the datastore is a relational database having an inbox queue and an outbox queue.

DETAILED DESCRIPTION OF THE INVENTION

Figure 1:
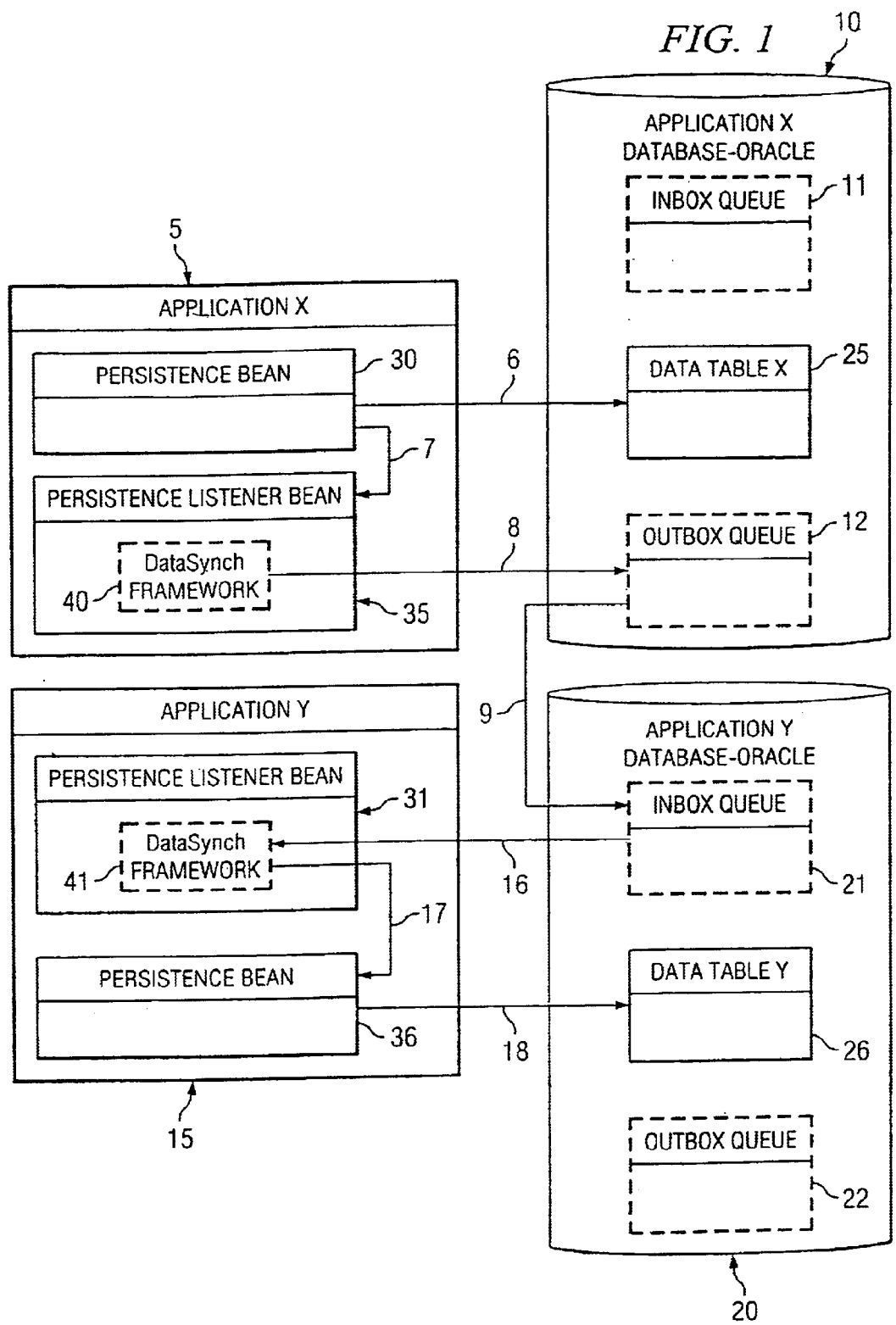
FIG. 1 is a graphical representation data synchronization in accordance with the invention.

As shown in FIG. 1, a first business application, labeled Application X and identified by reference numeral 5, has a corresponding first database, labeled Application X Database and identified by reference numeral 10. The Application X Database is a relational database having a Data Table X, identified by reference numeral 25, as well as an inbox queue 11 and an outbox queue 12. As used herein, a queue is a means for sending (e.g., the outbox queue) and receiving (e.g., the inbox queue) messages from a datastore such as a database.

In carrying out its functions, Application X interacts with Application X Database to create, retrieve, update, and delete data processed by Application X. As shown by arrow 6 in FIG. 1, Application X persists data in Data Table X through the use of Persistence Bean 30. As is well known to those skilled in the art, a bean is a term used to refer to a reusable software component written in the Java programming language, which is available from Sun Microsystems, Inc. A persistence bean refers to a reusable software component that is persisting (e.g., transferring or storing) data to the database. In carrying out this invention, Java Database Connectivity (JDBC) and structured query language (SQL) are used to query and persist data to the underlying databases. While a Java persistence bean is shown for persisting data to a database, any known persistence method may be used.

During the execution of Application X, a user may update information that needs to be stored in Application X Database. For example, a customer's address may change, and thus the updated information will be persisted to the underlying Application X Database by the Persistence Bean 30. The business application, upon receiving updated information, decides whether this information should be sent to other databases for synchronization. The synchronization decision can be made according to any known sequence or structure for making a logical decision in a software component, for example by comparing the updated information to a predetermined list requiring synchronization. In the example of FIG. 1, Application X makes a synchronization decision though use of Persistence Listener Bean 35.

Application X contains a second bean, a Persistence Listener Bean 35, which, as represented by arrow 7, monitors or "listens" to the Persistence Bean 30 to detect when Persistence Bean 30 is persisting data to underlying Application X Database 10. In other words, the Persistence Listener Bean listens to detect the occurrence of a persistence event. While a Java listener bean is shown as a monitor for persistence of data to a database, any known listener method may be used. Upon detecting a persistence event, the Persistence Listener Bean makes a persistence decision to determine whether the updated information should be synchronized. If not, no further action is taken. If a persistence event requires synchronization, Application X (through Persistence Listener Bean 35) calls Data Synchronization Framework 40, which is a reusable software component that may be plugged into any number of applications.

The data synchronization framework serves the dual functions of sending and retrieving synchronization messages for its host application. In FIG. 1, data synchronization framework 40 (hosted by Application X) is sending a data synchronization message containing updated information to outbox queue 12 on Application X Database 10. Data synchronization framework 41 (hosted by Application Y) is receiving the data synchronization message sent by data synchronization framework 40 from the inbox queue 21 on Application Y Database 20. As shown in the object model of FIG. 2, the data synchronization framework further comprises data synchronization service 50, inbox queue monitor 51, message factory 52, message mapper 53, message handler 54, and data synchronization exception 55.

Figure 2:
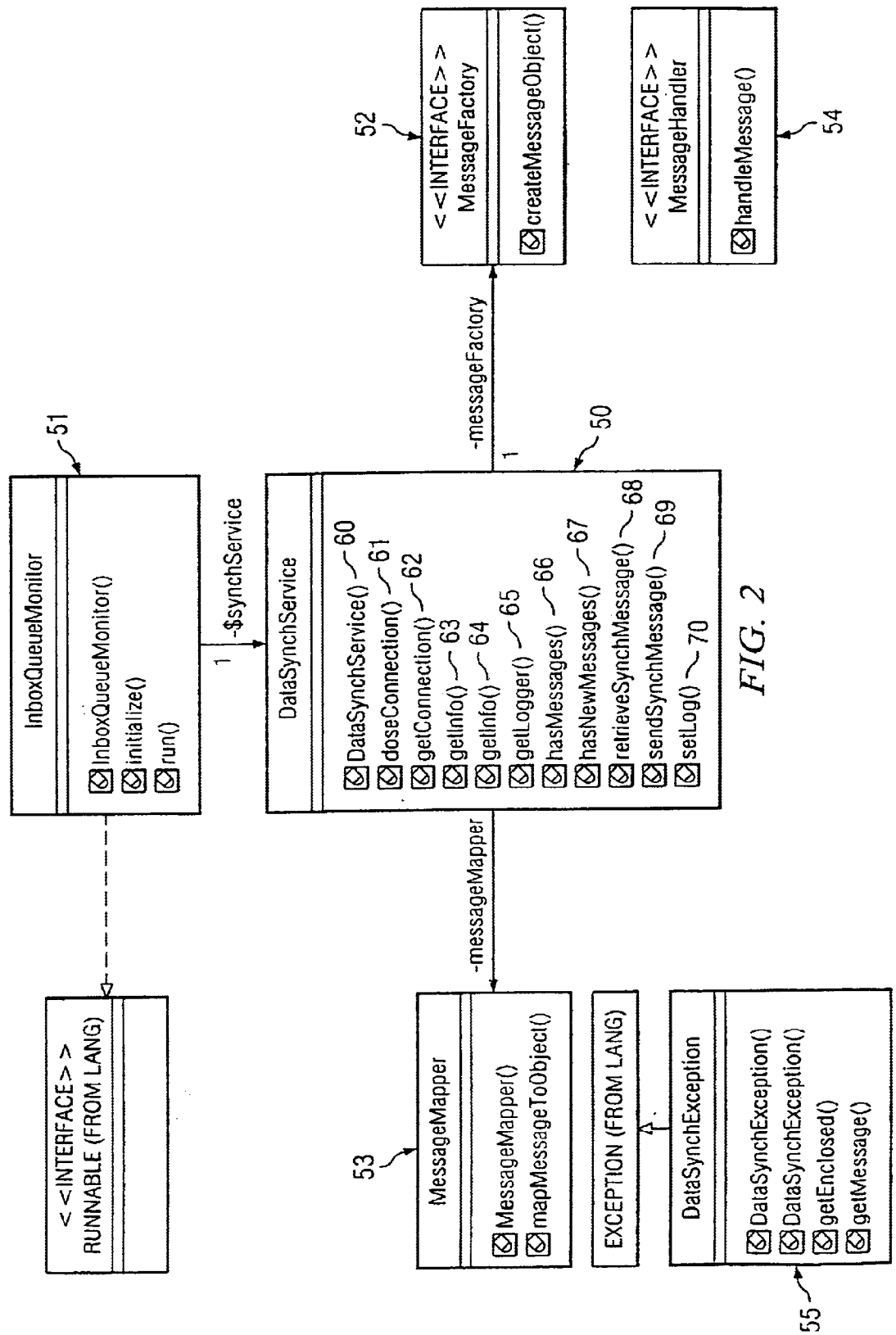
FIG. 2 is an object model of the data synchronization framework.

Data synchronization service 50 is the primary component of the data synchronization framework and provides the public entry point into the data synchronization framework. As shown in FIG. 2, Data synchronization service 50 comprises a number of methods including data synchronization service method 60 for creating a data synchronization service object; connection methods 61 and 62 for connection to the underlying database; information methods 63 and 64 for retrieving general information about the database session such as the database URL, user identification, session time, etc.; logging methods 65 and 70 for identifying and connecting to, respectively, the message logger being used; message checking methods 66 and 67 for checking the outbox and inbox queues, respectively, for messages; retrieval method 68 for retrieving a synchronization message; and send method 69 for sending a synchronization message. The content and structure of each of these types of messages will be well known to a person skilled in the art, and need not be described in detail here.

Figure 3:
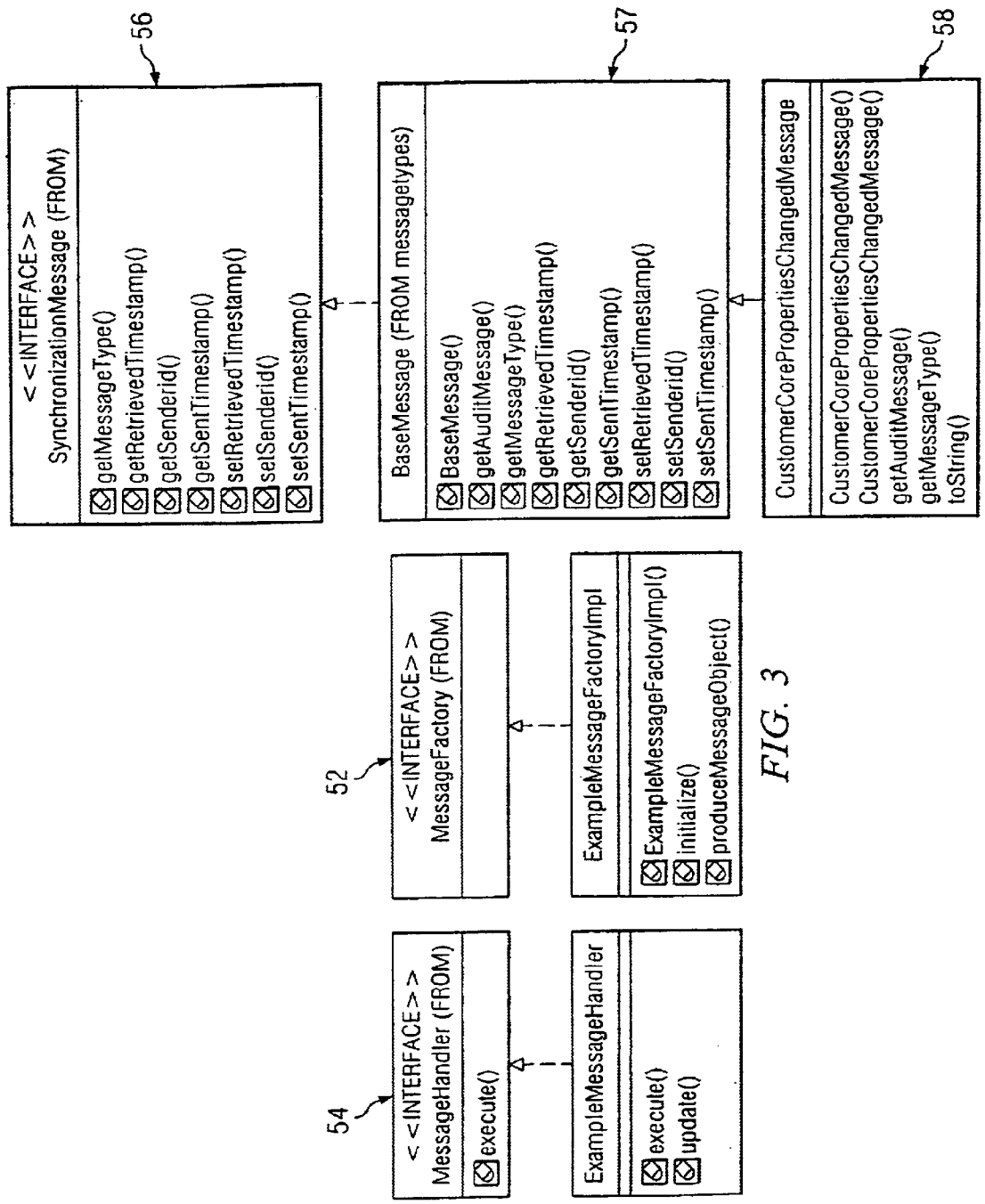
FIG. 3 is a design diagram of the message handler, message factory, and synchronization message components of the data synchronization framework.

To send a synchronization message, the business application (using the data synchronization framework) first instantiates a data synchronization service object, which in turn creates a connection to the underlying database. The application creates/assembles the synchronization message 56, as shown in FIG. 3. For example, if a core property of a customer (such as name, address, etc.) changes, the business application might construct a synchronization message, entitled Customer Core Properties Changed Message and identified by reference numeral 58, which would contain the updated information. Customer Core Properties Changed Message 58 is an implementation of the synchronization message 56, and contains the attributes of base message 57, which are common attributes to all message objects.

The synchronization message is sent by invoking send method 69 on the data synchronization service. The send method deconstructs the synchronization message from an object to a string and places the message string in the database outbox queue for propagation.

Upon receiving the synchronization message, outbox queue 12 broadcasts the message, as represented by arrow 9, to inbox queue 21 of linked Application Y Database 20. The synchronization message is in the form of a string when being broadcast and received by the database inbox and outbox queues. Preferably, the database queues have the ability to send and receive messages according to a point to point model. In point to point messaging, the outbox queue widely broadcasts messages (also referred to as propagating messages) to databases linked to receive the broadcast messages. A preferred database is an Oracle8 database release 8.0.5 with Advanced Queuing and Objects Options and equivalents thereof. While FIG. 1 only shows two databases linked together, any number of databases may be linked to receive the synchronization messages. Any known method of linking databases may be used which supports A point to point messaging, such as local or wide area networking, internet connections, Oracle proprietary database linking systems, etc.

A second business application, labeled Application Y and identified by reference numeral 15, has a corresponding second database, labeled Application Y Database and identified by reference numeral 20. The Application Y Database is a relational database having a Data Table Y, identified by reference numeral 26, as well as an inbox queue 21 and an outbox queue 22. In carrying out its functions, Application Y interacts with Application Y Database to create, retrieve, update, and delete data processed by Application Y. Like Application X, Application Y has a Persistence Bean 36 to persist information to Application Y Database, a Persistence Listener Bean 31 to detect a persistence event, and a Data Synchronization Framework 41.

As represented by arrow 16, Data Synchronization Framework 41 monitors inbox queue 21 of Application Y Database 20, retrieves any synchronization messages received therein, and determines the appropriate response to the synchronization message. If the synchronization message does not contain information that is relevant to Application Y, then it will simply be ignored. If the synchronization message contains information relevant to Application Y, for example updated information on a customer, then Data Synchronization Framework 41 will persist the updated information to the underlying database. Data Synchronization Framework 41 may persist the updated information using a persistence component, for example by calling Persistence Bean 36 (as represented by arrow 17) and requesting that the updated information be persisted to Application Y Database (as represented by arrow 18) or by invoking a method on a message handler object, as discussed below.

To receive a synchronization message, the business application (using the data synchronization framework) may either periodically check the inbox queue directly or indirectly through use an inbox queue monitor. To check the inbox queue directly, the business application (using the data synchronization framework) first instantiates a data synchronization service object, which in turn creates a connection to the underlying database. The application checks for messages by invoking a message check method on the data synchronization service, for example the method entitled Has New Messages and identified by reference numeral 67 on FIG. 2. If no new message is present in the inbox queue, a exception is thrown, for example the exception entitled Data Synch Exception and identified by reference numeral 55 on FIG. 2. If a new message is present in the inbox queue, the application retrieves the message through the data synchronization service by a) invoking a message retrieval method, for example the method entitled Retrieve Synch Message and identified by reference numeral 68, to retrieve the message string from the inbox queue; b) calling a message factory to create/assemble a synchronization message object, said message factory being any suitable factory for producing objects as known to one skilled in the art; c) calling a message mapper to map (i.e., populate) the synchronization message object with the content of the message string retrieved from the database inbox, said message mapper being any means for mapping objects as known to one skilled in the art; and d) returning an assembled message synchronization object to the application.

Once the synchronization message object has been retrieved directly, the application checks to see if the updated information contained in the synchronization message object is relevant to the business application. If not, no further action is taken. If the updated information is relevant, then the updated information is persisted to the application's underlying database, either directly or preferably through use of a persistence component such as a persistence bean.

In order to retrieve a synchronization message indirectly through use an inbox queue monitor, the business application (using the data synchronization framework) first instantiates a data synchronization service object, which in turn creates a connection to the underlying database. The application checks for messages by implementing Inbox Queue Monitor 51, as shown in FIG. 2. The inbox queue monitor, preferably in the form of a Java thread, monitors the inbox queue and upon detecting the presence of a new message, retrieves the message by a) calling a message factory to create/assemble a synchronization message object, said message factory being any suitable factory for producing objects as known to one skilled in the art; b) calling a message mapper to map (i.e., populate) the synchronization message object with the content of the message string retrieved from the database inbox, said message mapper being any means for mapping objects as known to one skilled in the art; and c) returning an assembled synchronization message object to the application.

Once the synchronization message object has been indirectly retrieved using an inbox queue montior, the application checks to see if the updated information contained in the synchronization message object is relevant to the business application. The relevance decision can be made according to any known sequence or structure for making a logical decision in a software component, for example by comparing the updated information to a predetermined list requiring synchronization. If the updated information is not relevant, the message is dropped and no further action is taken. If the updated information is relevant, the application invokes message handler 54 to take the designated synchronization action upon the message. A message handler is an object that contains one or more methods for acting upon the updated information when called upon to do so. The message handler implements its method upon instantiation, the method typically being a method for persisting data to an underlying database, either directly or indirectly through use of persistence component such as a persistence bean.

While the embodiment in FIG. 1 is shown using relational databases, any suitable datastore having point to point messaging capabilities may be used. Datastore as used herein means any type of data storage software, device or medium, including datafiles, databases, memory chips, hard drives, floppy drives, magnetic storage media, optical storage media, and the like. Preferably, the datastore is a database, which can be either a relational or object database. Most preferably, the datastore is a relational database. Examples of suitable databases are Oracle Inc.'s relational database products such as Oracle8 database release 8.0.5 with Advanced Queuing (AQ) and Objects Options and object databases produced by Versant Inc. The datastore can be located remotely and accessed by means such as the Object Management Group's Common Object Request Broker Architecture (CORBA), which retrieves information from remotely located underlying datastores such as relational databases. When the underlying datastore comprises a relational database, object-relational (OR) mapping tools, such as TOPLink produced by The Object People, Inc., may be used in carrying out the invention. As known to those skilled in the art, OR mapping tools serve as a communications bridge between object technology and relational database technology. Likewise, Java Database Connectivity (JDBC, which is available from Sun Microsystems, Inc.) can be used to in carrying out this invention to serve as a communications bridge between the preferred Java programming language of the framework and wide-range of relational databases. JDBC provides a call-level application programming interface (API) for SQL-based databases. In a preferred embodiment of the invention described herein, Oracle Inc.'s "type 4" thin driver is used to connect to an Oracle relational database. The Java/Versant interface (JVI) available from Versant Inc. can be used to in carrying out this invention to serve as a communications bridge between the Java programming language and object databases produced by Versant Inc.

A preferred computer language for carrying out the invention is the Java programming language available from Sun Microsystems Inc. While the code examples herein are written in Java, other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples.

EXAMPLE

The following pseudo-code, written in Java, outlines a representative embodiment of the invention, where the text following the double backslashes (i.e., "//") is commentary text.

1. Create an initialization file with the following format

```
#############DataSynch_ConnectionProps #################
DataSynch_ConnectionProps.driver=oraclejdbc.driver.OracleDriver
DataSynch_ConnectionProps.url=jdbc:oracle:thin:@144.226.224.61:
1521:d1com1
DataSynch_ConnectionProps.user=silknet_synch
DataSynch_ConnectionProps.password=silknet_synch
#############DataSynch_QueueProps #################
DataSynch_QueueProps.queue=silknet_synch.queue_table
DataSynch_QueueProps.outbox=SILKNET_OUTBOX
DataSynch_QueueProps.inbox=SILKNET_INBOX
DataSynch_QueueProps.dequeue=dequeue_message
DataSynch_QueueProps.dequeue_signature=(?,?,?,?,?,?)
DataSynch_QueueProps.enqueue=enqueue_message
DataSynch_QueueProps.enqueue_signature=(?,?,?,?)
#############DataSynch_MessageHandlerProps #################
DataSynch_MessageHandlerProps.CustomerCorePropertiesChanged=your
PackageName.yourMessageHandler
DataSynch_MessageHandlerProps.QMonitor_Sleep_Interval=5000
#############DataSynch_MessageProps #################
DataSynch_MessageProps.yourMessageName=yourPackageName.your
MessageName
#############DataSynch_EnvironmentProps #################
DataSynch_EnvironmentProps.log_file_location=d:\\yourAppLog.txt
DataSynch_EnvironmentProps.log_file_append_flag=true
DataSynch_EnvironmentProps.logging_filter_level=1
```

2. Create a method in your application that reads this file and creates a 'java.util.Properties' object.

```
The 'Properties' object (dataSynchProps) MUST have the following
structure:
    {DataSynch_ConnectionProps=java.util.properties,
    DataSynch_QueueProps=java.util.properties,
    DataSynch_MessageHandlerProps=java.util.properties,
    DataSynch_MessageProps=java.util.properties}
    The 'Properties' object set as the value for the
'DataSynch_ConnectionProps' key MUST have the following keys:
    {driver=java.lang.String, url=java.lang.String,
user=java.lang.String, password=java.lang.String}
    The 'Properties' object set as the value for the
'DataSynch_QueueProps' key MUST have the following keys:
    {queue=java.lang.String, outbox=java.lang.String,
```

-continued

```
user=java.lang.String, inbox=java.lang.String,
    dequeue=java.lang.String, dequeue_signature=java.lang.String,
enqueue=java.lang.String,enqueue_signature=java.lang.String}
    The 'Properties' object set as the value for the
'DataSynch_MessageHandlerProps' key MUST have the following keys:
    {QMonitor_Sleep_Interval_java.lang.String,
    messageType1=correspondingHandler,
    messageType2=correspondingHandler, . . . ,
    messageTypeN=correspondingHandler}
    that is all message types and their appropriate handlers.
    For example:
PartyCorePropertiesChanged=com.sprint.arch.datasynch.test.messages.
PartyCorePropertiesChangedMessageHandler
    The 'Properties' object set as the value for the
'DataSynch_MessageProps' key MUST have the following keys:
    {messageType1=fullQualifiedClassName,
    messageType2=fullQualifiedClassName,
    messageType3=fullQualifiedClassName, . . . ,
    messageTypeN=fullQualifiedClassName}
    that is all message types and their fully qualified class names.
    For example: UserEnable=com.sprint.arch.datasynch.test.messae.User
    EnabledMessage
```

3. The Class that reads the initialization file and creates the 'java.util.Properties' object required by the constructor of the 'DataSynchService' class (public interface of the framework)

```
import java.util.*;
import com.sprint.arch.applicationenviromnent.*;
import com.sprint.arch.configuration.*;
import com.sprint.arch.datasynch.*;
public class MyUtil{
        public static Properties getDataSynchProps( ) {
            try {
            // Getting an instance of the ApplicationManager
            ApplicationEnvironmentManager appManager =
            ApplicationEnvironmentManager.instance( );
            ApplicationEnvironmentDef appenv = new
            ApplicationEnvironmentDef( );
            // Loading the Ini File
            Properties appProperties = new Properties( );
            IniSource source = null;
            source = new IniSource(System.getProperty("iniFile"));
            source.load(appProperties);
            // Create the DataSynch Props
            appenv.setProperties(appProperties);
            Properties dataSynchProps = new Properties( );
            Properties cProps =
            appenv.getProperties(Info.CONNEC-
            TION_PROPS_KEY);
            dataSynchProps.put(Info.CONNECTION_PROPS_KEY,
            cProps);
            Properties qProps =
            appenv.getProperties(Info.QUEUE_PROPS_KEY);
            dataSynchProps.put(Info.QUEUE_PROPS_KEY qProps);
            Properties mProps =
            appenv.getProperties(Info.MSG_PROPS_KEY);
            dataSynchProps.put(Info.MSG_PROPS_KEY,
            mProps);
            Properties mhProps =
            appenv.getProperties(Info.MSG_HAND-
            LER_PROPS_KEY);
            dataSynchProps.put(Info.MSG_HAND-
            LER_PROPS_KEY, mhProps);
            Properties envProps =
            appenv.getProperties(Info.ENV_PROPS_KEY);
            dataSynchProps.put(Info.ENV_PROPS_KEY, envProps);
            // Registering Application with ApplicationManager
            appManager.put("Data Synch", appenv);
            return dataSynchProps;
        } catch (Exception e) {
        e.printStackTrace( );
        }
```

-continued

```
    return null;
    }
  }
}
```

4. Connect, send and receive messages:
   To send messages:
   a. Create a DataSynchService object

```
try {
DataSynchService synchService = DataSynchService (messageFactory,
dataSynchProps);
``` b. Create a SynchronizationMessage object and call the sendSynchMessage(SynchronizationMessage msg) method.

```
... SynchronizationMessage sMessage = ... create a Synch Message
boolean success = synchService.sendSynchMessage(sMessage)
if (success)
    ... do something;
else
    ... do something else;
} catch (DataSynchException e)
{
... handle exception
}
```

To retrieve messages:
  a. Create a DataSynchService object

```
try {
DataSynchService synchService = DataSynchService (messageFactory,
dataSynchProps);
``` b. Check for messages in the inbox queue, if true call the retrieveSynchMessage. An exception is thrown if an attempt to retrieve messages is made when hasNewMessages returns false.

```
while(synchService.hasNewMessages( ))
{
sMessage = retrieveSynchMessage( );
...    do something with the message;
} catch (DataSynchException e)
{
...    .handle exception
}
```

To retrieve messages with an inbox queue monitor:
  a. Initialize

```
try{
   YourMessageFactoryImpl messageFactory = new
   YourMessageFactoryImpl( );
   InboxQueueMonitor monitor = new
   InboxQueueMonitor(messageFactory, dataSynchProps);
``` b. Start the thread

```
   Thread thread = new Thread(monitor);
   thread.start( );
   } catch (DataSynchException e)
   {
   ... handle exception
   }
```

What is claimed is:

1. A data synchronization framework, comprising:

a plurality of data synchronization service objects connected to a corresponding plurality of underlying databases, each or the data synchronization service objects having a method to send an outgoing synchronization message to the corresponding database and a method to retrieve an incoming synchronization message from the corresponding database; and a message handler object having a method for persisting relevant information contained in the incoming data synchronization message to the underlying databases in response to a persistence request from the synchronization service objects such that common data is synchronized between the databases, wherein sending and receiving of messages between databases occur at a database layer in contrast to an application layer.

2. The framework of claim 1 wherein at least one of the databases is a relational database having an inbox queue and an outbox queue.

3. The framework of claim 2 further comprising an inbox queue monitor which monitors the inbox queue and retrieves any incoming data synchronization messages contained therein.

4. The framework of claim 3 wherein the data synchronization message is in the form of an object.

5. The framework of claim 4 further comprising a message factory for assembling the data synchronization message object.

6. The framework of claim 5 further comprising a message mapper to populate the data synchronization message object with the relevant information.

7. A method for synchronizing data, comprising:
   (a) instantiating a first data synchronization service object and a second data synchronization service object, the first data synchronization service object being connected to a first database and the second data synchronization service object being connected to a second database;
   (b) sending a data synchronization message containing relevant information from the first data synchronization service object to an outbox queue on the first database;
   (c) propagating the data synchronization message from the outbox queue on the first database to an inbox queue on the second database;
   (d) receiving the data synchronization message from the inbox queue on the second database to the second data synchronization object; and
   (e) persisting the relevant information in the second database such that common data is synchronized between the first and second databases, wherein the sending and receiving of messages between the first and second databases occur at a database layer in contrast to an application layer.

8. The method of claim 7 further comprising the step of deconstructing the data synchronization message from an object to a string prior to its being propagated from the outbox queue on the first database.

9. The method of claim 7 further comprising monitoring the inbox queue on the second database to detect the presence of a data synchronization message.

10. The method of claim 9 further comprising the step of assembling a data synchronization message object from a string after its being received by the inbox queue on the second database.

11. The method of claim 10 wherein a message factory is used to assemble the data synchronized message object.

12. The method of claim 11 further comprising the step of populating the data synchronization message object with the relevant information.

13. The method of claim 12 wherein a message handler object is used to persist the relevant information to the second database.

* * * * *